UNITED STATES PATENT OFFICE.

EDWIN O. BARSTOW, OF MIDLAND, MICHIGAN, ASSIGNOR, BY MESNE ASSIGNMENTS, TO THE CLEVELAND TRUST COMPANY, TRUSTEE, OF CLEVELAND, OHIO, A CORPORATION OF OHIO.

METHOD OF MANUFACTURING ARSENATE OF LEAD.

1,141,920.   Specification of Letters Patent.   Patented June 8, 1915.

No Drawing.   Application filed June 10, 1911.   Serial No. 632,445.

*To all whom it may concern:*

Be it known that I, EDWIN O. BARSTOW, a citizen of the United States, and a resident of Midland, county of Midland, and State of Michigan, have invented a new and useful Improvement in Methods of Manufacturing Arsenate of Lead, of which the following is a specification, the principle of the invention being herein explained and the best mode in which I have contemplated applying that principle, so as to distinguish it from other inventions.

The present method or process, while presented more particularly as a process of manufacturing lead arsenate, is equally applicable to the manufacture of other insoluble metallic arsenates, as for example, zinc, iron and barium arsenates. The process constituting the present invention, then, consists of the steps hereinafter fully described, and particularly pointed out in the claims.

The following description sets forth in detail one approved mode of carrying out the invention, such disclosed mode, however, being merely illustrative of the various ways in which the principle of the invention may be used.

The general method of procedure involved in the improved process under consideration consists in oxidizing an arsenic derivative to arsenic acid by means of a halogen; separating out such halogen as an insoluble haloid; and reacting with such arsenic acid on a suitable compound of the metal, the arsenate of which is desired as a final product. As previously indicated, the process is applicable to any metal capable of being precipitated as such arsenate from its corresponding soluble salt such as its haloid.

When white arsenic, or arsenious oxid $(As_2O_3)$, as the specific arsenic derivative of the general process above outlined, is oxidized to arsenic acid by being treated with chlorin, as the specific halogen of such process, in the presence of water, the reaction may be represented by the following equation:—

$$As_2O_3 + 4Cl + 5H_2O = 2H_3AsO_4 + 4HCl.$$

In other words, as indicated, the result is a mixture of arsenic acid and hydrochloric acid. To such resulting mixture of acids in solution, I then add a suitable lead compound, such as lead oxid, hydrate, carbonate, or basic carbonate, thereby obtaining a precipitate of lead chlorid and a solution of arsenic acid as per the following equation written for the oxid:—

$$2H_3AsO_4 + 4HCl + 2PbO = 2H_3AsO_4 + 2PbCl_2 + 2H_2O.$$

Such lead compound, as indicated, is added to the solution in amount sufficient to combine with the chlorin present. To accomplish this reaction the lead oxid, or equivalent lead derivative, is mixed with the solution of arsenic and hydrochloric acids from the preceding reaction and stirred for a considerable length of time, so that the lead oxid may become thoroughly converted to such lead chlorid, this operation being conducted in the presence of water insufficient in amount to dissolve any substantial part of the lead chlorid that is formed. The solution, now practically a solution of arsenic acid, may then be separated from the solid lead chlorid, as by decantation or filtration, and is next used in reacting on a suitable compound of the metal of which the arsenate is desired, such metal being lead, in the assumed instance in hand. This remaining step is carried out by adding to the solution in question, either an oxid, hydrate, carbonate, or basic carbonate of lead and may be thus exhibited:—

$$2H_3AsO_4 + 2PbO = 2PbHAsO_4 + 2H_2O.$$

The foregoing reaction illustrates the use of the oxid; the result where the carbonate, just referred to, is employed is specifically illustrated in the following reaction:—

$$2H_3AsO_4 + 2PbCO_3 = 2PbHAsO_4 + 2CO_2 + 2H_2O,$$

while the others should not require to be written out in order to be understood.

In carrying out the first reaction, whereby, in other words, the arsenic is oxidized, the white arsenic and water are charged into suitable open tanks or tubs, and the chlorination is conducted in stone-ware, coke-packed chlorination towers, the mixture to be chlorinated being pumped continuously over said towers. A stirrer may be fitted to the tank so as to keep the white arsenic suspension in order that it will be pumped over the chlorinating tower together with the water, or the rate of pumping may be so great that enough arsenic will be carried in solution to take up the chlorin as fast as it is supplied, and the tank itself be used simply as a saturating tank.

The two remaining steps of the process, wherein the lead oxid, or equivalent oxygen derivative of lead, is combined with, first the hydrochloric acid, and then the arsenic acid, which are obtained as a result of the first step, are satisfactorily conducted in wooden tanks provided with suitable stirrers. It has already been indicated that in precipitating the hydrochloric acid as lead chlorid, the amount of water is insufficient to dissolve such chlorid as it is formed. In the final step in which the arsenic acid is converted into lead arsenate, the solution is also desirably so concentrated that the resulting mass will have the consistency of a cream or paste. It has been discovered that by sufficiently prolonging the stirring, the lead arsenate may be made from the solid lead oxid, hydrate, carbonate, or basic carbonate, despite the fact that, at first sight, it would seem that this reaction could not be carried to completion, because the resulting product being solid, all of the lead oxid would not be reacted upon, but particles of it would be inclosed in an impervious coating of the lead arsenate. By subjecting the liquid, however, to prolonged stirring or agitation, this tendency has been successfully overcome, as above indicated.

In actual commercial practice, the simple process as above outlined is somewhat elaborated upon in the following fashion. Instead of stopping with the formation of the acid arsenate by agitating the separated arsenic acid, resulting from the chlorination step, with lead oxid, the latter compound is used in quantity insufficient to neutralize all of the arsenic acid. The precipitate is next collected on a filter and washed, and the filtrate and washings treated with sodium carbonate and then precipitated with lead chlorid to form the normal lead arsenate, the two reactions in question being exhibited by the following equations:—

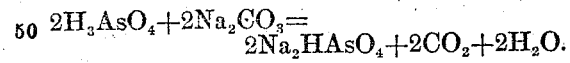
$$2H_3AsO_4 + 2Na_2CO_3 = 2Na_2HAsO_4 + 2CO_2 + 2H_2O.$$

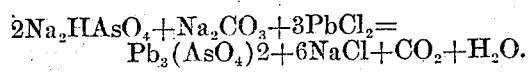
$$2Na_2HAsO_4 + Na_2CO_3 + 3PbCl_2 = Pb_3(AsO_4)_2 + 6NaCl + CO_2 + H_2O.$$

The lead chlorid separated out from the arsenic acid upon the addition of lead oxid to the solution of such arsenic acid and hydrochloric acid obtained as a result from the first reaction, may be dissolved in water and used for the precipitation of the normal lead arsenate, as in the last reaction above; although, of course, the lead chlorid for this purpose may be derived from any other suitable source, if preferred; and the lead chlorid secured as above may be similarly disposed of in ways entirely unconnected with the present process.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The method of separating arsenic acid from a solution containing an admixture of hydrochloric acid, which consists in adding to such solution a lead compound capable of forming lead chlorid with the hydrochloric acid; separating out the lead chlorid thus formed; and then adding a lead compound capable of forming lead arsenate.

2. The method of separating arsenic acid from a solution containing an admixture of hydrochloric acid, which consists in adding to such solution a lead compound capable of forming lead chlorid with the hydrochloric acid; separating out the lead chlorid thus formed; and then reacting with the arsenic acid on an oxygen derivative of lead capable of forming lead arsenate.

3. The method of separating arsenic acid from a solution containing an admixture of hydrochloric acid, which consists in adding to such solution a lead compound capable of forming lead chlorid with the hydrochloric acid; separating out the lead chlorid thus formed; and then reacting with the arsenic acid on lead oxid.

4. The method of separating arsenic acid from a solution containing an admixture of hydrochloric acids, which consists in stirring such solution with an oxygen derivative of lead capable of forming lead chlorid with such hydrochloric acid and of forming arsenate of lead with such arsenic acid, in amount sufficient to combine with the hydrochloric acid present; and then reacting with the arsenic acid on a further amount of such oxygen derivative of lead.

5. The method of separating arsenic acid from a solution containing an admixture of hydrochloric acid, which consists in stirring such solution with an oxygen derivative of lead capable of forming lead chlorid with such hydrochloric acid and of forming arsenate of lead with such arsenic acid, in amount sufficient to combine with the hydrochloric acid present; and then reacting with the arsenic acid on a further amount of such oxygen derivative of lead, the latter being used in quantity insufficient to combine with all the arsenic acid present.

6. The method of separating arsenic acid from a solution containing an admixture of hydrochloric acid, which consists in stirring such solution with lead oxid in amount sufficient to combine with such hydrochloric acid as lead chlorid; separating out the latter; and then stirring the residual solution containing such arsenic acid with more lead oxid, whereby lead arsenate is produced.

7. The method of separating arsenic acid from a solution containing an admixture of hydrochloric acid, which consists in stirring such solution with lead oxid in amount sufficient to combine with such hydrochloric acid as lead chlorid; separating out the latter; and then stirring the residual solution containing such arsenic acid with more lead oxid, whereby lead arsenate is produced, such lead oxid being used in quantity insufficient to combine with all the arsenic acid present.

8. The method of separating arsenic acid from a solution containing an admixture of hydrochloric acid, which consists in stirring such solution with an oxygen derivative of lead capable of forming lead chlorid with such hydrochloric acid and of forming arsenate of lead with such arsenic acid, in amount sufficient to combine with the hydrochloric acid present; then reacting with the arsenic acid on a further amount of such oxygen derivative of lead, the latter being used in quantity insufficient to combine with all the arsenic acid present; neutralizing the residual arsenic acid with an alkaline carbonate; and treating the soluble arsenate thus formed with a suitable lead compound.

9. The method of separating arsenic acid from a solution containing an admixture of hydrochloric acid, which consists in stirring such solution with an oxygen derivative of lead capable of forming lead chlorid with such hydrochloric acid and of forming arsenate of lead with such arsenic acid, in amount sufficient to combine with the hydrochloric acid present; then reacting with the arsenic acid on a further amount of such oxygen derivative of lead, the latter being used in quantity insufficient to combine with all the arsenic acid present; neutralizing the residual arsenic acid with an alkaline carbonate; and treating the soluble arsenate thus formed with lead chlorid.

10. The method of separating arsenic acid from a solution containing an admixture of hydrochloric acid, which consists in stirring such solution with an oxygen derivative of lead capable of forming lead chlorid with such hydrochloric acid and of forming arsenate of lead with such arsenic acid, in amount sufficient to combine with the hydrochloric acid present; then reacting with the arsenic acid on a further amount of such oxygen derivative of lead, the latter being used in quantity insufficient to combine with all the arsenic acid present; neutralizing the residual arsenic acid with sodium carbonate; and treating the soluble arsenate thus formed with lead chlorid.

Signed by me this 6th day of June, 1911.

EDWIN O. BARSTOW.

Attested by—
G. LEE CAMP,
D. A. NEWLAND.